(No Model.)

G. A. & D. C. BLINN.
AMALGAMATOR AND SEPARATOR.

No. 546,378. Patented Sept. 17, 1895.

Witnesses

Inventors
George A. Blinn
Daniel C. Blinn
By T. J. W. Robertson
Attorney

UNITED STATES PATENT OFFICE.

GEORGE A. BLINN, OF TRES PIEDRAS, TERRITORY OF NEW MEXICO, AND DANIEL C. BLINN, OF DENVER, COLORADO, ASSIGNORS OF ONE-THIRD TO ALBERT A. CARPENTER, OF TRES PIEDRAS, TERRITORY OF NEW MEXICO.

AMALGAMATOR AND SEPARATOR.

SPECIFICATION forming part of Letters Patent No. 546,378, dated September 17, 1895.

Application filed December 12, 1894. Serial No. 531,578. (No model.)

*To all whom it may concern:*

Be it known that we, GEORGE A. BLINN, of Tres Piedras, in the county of Taos and Territory of New Mexico, and DANIEL C. BLINN, of Denver, in the county of Arapahoe and State of Colorado, citizens of the United States, have invented certain new and useful Improvements in Amalgamators and Separators, of which the following is a specification, reference being had therein to the accompanying drawings.

This improvement is designed to provide an amalgamator and separator that will be easily and cheaply made and convenient and rapid in operation and not likely to get out of order; and the invention consists in the peculiar construction, arrangement, and combinations of parts hereinafter more particularly described and then definitely claimed.

Figure 1:
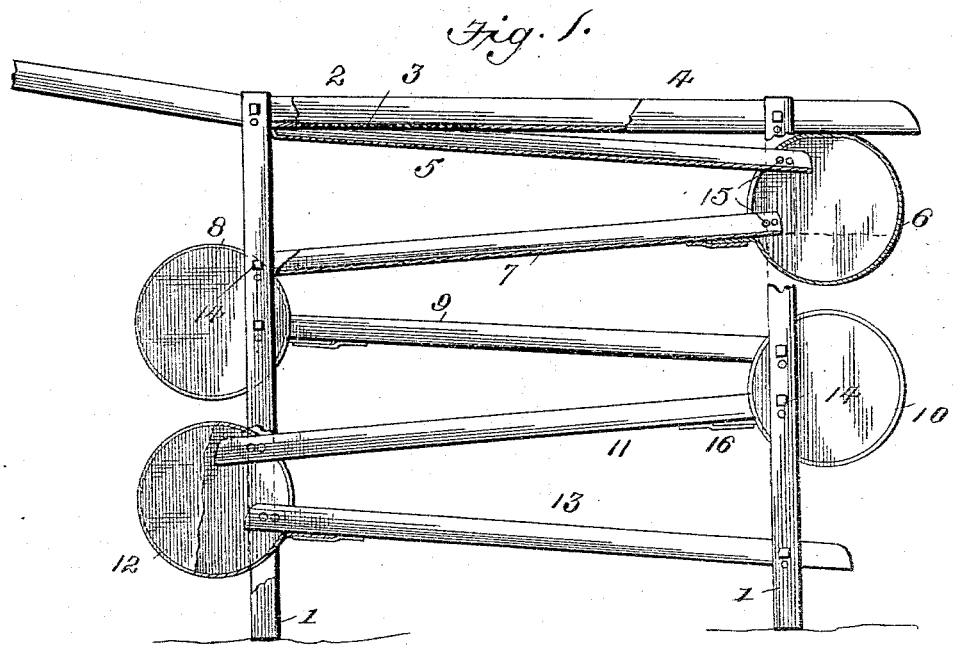
Figure 2:
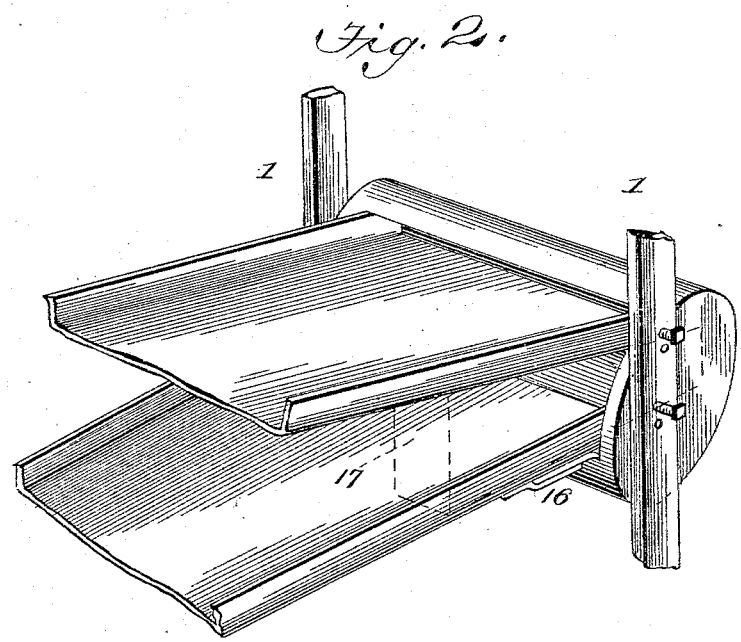

In the accompanying drawings, Figure 1 is a side view of an amalgamator and separator constructed according to our invention with parts broken away the better to show the construction. Fig. 2 is a detail on a larger scale of one of the drums and parts of two pans.

Referring now to the details of the drawings by figures, 1 1 represent the frame of the machine, at the top of which is a chute 2, down which the water and sand pass to a wire screen 3, and over which screen the rock or sand too large to pass through the sieve is carried by the water (which is supplied in sufficient quantity for this purpose) onto the pan 4, where it is washed off at the end. Below the screen is a pan 5, the end of which enters a drum 6 for about five inches. The upper end of another pan 7 also extends into this drum for about three inches, which pan is inclined in the opposite direction and enters another drum 8, into which it projects about the same as pan 5 does into drum 6, or about five inches. Below this second pan is a third pan 9, which projects into drum 8 about two inches and enters a third drum 10, in which is the upper end of a fourth pan 11, that enters a fourth drum 12, in which is the upper end of a fifth pan 13. In all of these drums the lower ends of the pans project about five inches, while the upper ends of the pans only enter the drums about three inches, so that the lower end of one overhangs the upper end of the other about two inches; but we do not limit ourselves to this exact measurement.

It will be observed (see Fig. 2) that the drums are secured to the frame by bolts 14, so that they can be readily removed or changed, as desired.

It will also be seen that the pans are secured to the frame by bolts which may be set in either of the holes 15 in the edge of the pan or any of the bolt-holes shown in the uprights of the frame, so that the pans may be adjusted to different inclinations that may be found best for the different varieties of material passing through the machine, or the pans may be adjusted farther in or out of the drum, according to the greater or less eddy found to be necessary with the different kinds of ores employed.

When in operation, the sand and water that pass through the screen, as above described, pass down the pan 5 into the drum 6, where they follow the shape of the drum, making an eddy under the bottom of the upper end of the pan, as shown by dotted lines, and allowing the gold to settle at the points and amalgamate with the mercury set therein. From drum 6 the sand and water pass down the different pans and through the different drums in succession, as will be understood, leaving some of the precious metal in each, until the tailings pass off at the lower end of pan 13.

In order to keep the water from passing out of the drum underneath the lower pan, we extend the side of the drum outward, as shown in Fig. 2, so as to enter a kind of pocket formed by a piece of sheet metal 16, attached to the bottom of the lower pan.

Various ways of adjusting the level of the pans may be employed. If preferred, wedges 17 (shown in dotted lines in Fig. 2) may be employed. By pushing in or drawing out these wedges the inclination of the pans may be readily changed; but in such case the lower ends of the pans should not be bolted to the frames.

We consider the adjustment of the projection of the lower pans to different distances over the edges of the drums to be important, as by this means the eddy created in the drum and the time the material is detained in the drum may be increased or diminished, according to the material employed.

We do not intend to limit ourselves to the exact number of pans and drums shown, as more or less may be used without departing from the spirit of our invention.

What we claim as new is—

1. In a separator, the combination of a frame, a series of drums adjustably mounted therein, and a corresponding series of pairs of oppositely inclined adjustable pans entering apertures in the drums, the upper pan in each pair projecting over the lower one and the lower one projecting beyond the edge of the opening into the drum, and adjustable to different distances over said edge of said opening, substantially as described.

2. In a separator, the combination of a frame having a series of adjusting bolt holes, a series of pans and drums supported by said frame, the pans being arranged in oppositely-inclined pairs projecting into openings in the drums, the upper pan projecting beyond the lower one, and said lower one projecting beyond the edge of the opening into the drum, and adjustable to different distances over said edge of said opening, and bolts passing through holes made in said frame, pans and drums, whereby the drums may be readily removed and the position of the pans readily adjusted, substantially as described.

3. In a separator, a frame, a removable drum having an opening at its side and an extension at the lower part of said opening, a pair of pans extending into said opening, the lower pan projecting beyond the edge of said opening into the drum and provided on its under side with a pocket to receive the extension of the drum, substantially as described.

In testimony whereof we affix our signatures, in presence of two witnesses, this 30th day of November, 1894.

GEORGE A. BLINN.
DANIEL C. BLINN.

Witnesses to the signature of George A. Blinn:
WILLIAM PEET,
Mrs. WM. PEET.

Witnesses to the signature of Daniel C. Blinn:
CHARLES F. FURY,
ROBT. W. BONNAGE.